(12) United States Patent
Akiyama et al.

(10) Patent No.: US 6,244,258 B1
(45) Date of Patent: Jun. 12, 2001

(54) EGR CONTROLLER FOR CYLINDER CUT-OFF ENGINE

(75) Inventors: Eitetsu Akiyama; Toshiyuki Suzuki; Ryuji Kohno; Morio Fukuda, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/443,737

(22) Filed: Dec. 1, 1999

(30) Foreign Application Priority Data

Dec. 2, 1998 (JP) .................................................. 10-343186
Dec. 2, 1998 (JP) .................................................. 10-343187

(51) Int. Cl.$^7$ ............................ F02M 25/07; F02D 17/02
(52) U.S. Cl. .................................. 123/568.21; 123/198 F
(58) Field of Search .................... 123/568.11, 568.21, 123/568.24, 568.26, 568.27, 198 F

(56) References Cited

U.S. PATENT DOCUMENTS

| 4,292,938 | * | 10/1981 | Tanaka et al. | 123/198 F |
| 4,303,053 | * | 12/1981 | Etoh et al. | 123/198 F |
| 4,313,406 | * | 2/1982 | Iizuka et al. | 123/198 F |
| 4,484,548 | * | 11/1984 | Sugasawa et al. | 123/198 F |
| 5,562,085 | * | 10/1996 | Kosuda et al. | 123/198 F |
| 5,562,086 | * | 10/1996 | Asada et al. | 123/568.21 |

FOREIGN PATENT DOCUMENTS

| 0123456 A2 | * | 1/2000 | (EP) . |
| 60-45767 | | 3/1985 | (JP) . |

* cited by examiner

*Primary Examiner*—Willis R. Wolfe
(74) *Attorney, Agent, or Firm*—Armstrong, Westerman, Hattori, McLeland & Naughton, LLP

(57) ABSTRACT

The EGR controller 1 controls the EGR actions wherein exhaust gas from the cylinder cut-off engine 3 which can change over the running condition between the all-cylinder run and the cut-off-cylinder is recirculated to the induction. The EGR controller 1 comprises an EGR control valve 6 for opening and closing the EGR pipe 13, a water temperature sensor 5 for detecting cooling water temperature TW and an ECU 2, and the ECU 2 controls the EGR actions so as tobe executed if the cooling water temperature TW is higher (determined as "Yes" at Step 10) than the upper limit value TWE1H while at the all-cylinder run (determined as "No" at Step 2) or if the cooling water temperature TW is higher than the lower limit value TWE1L while at the cut-off-cylinder run (determined as "Yes" at Step 2).

16 Claims, 5 Drawing Sheets

EGR CONTROLLER FOR CYLINDER CUT-OFF ENGINE

BACKGROUND OF THE INVENTION

1. Field of the Invention

The present invention relates to an EGR controller of a cylinder-cut-off-engine which controls actions of exhaust gas recirculation (EGR) in a cylinder cut-off engine which can run with change over of the running condition between an all-cylinder operation with change over between all cylinders operating and a cut-off-cylinder run where some of the cylinders are cut off.

2. Description of the Related Art

A conventionally known type of the EGR controller for cylinder cut-off engine is such as on Japanese Patent Laying-Open Gazette Showa-60-45767 (1985). This cylinder cut-off engine is a four-cylinder engine which runs with change over between a cut-off-cylinder run where fuel supply to two of four cylinders is stopped as conditioned in regard to engine cooling water temperatures, revolving speeds and acceleration and deceleration states and where induction and exhaust valves of these two cylinders are maintained in a blocked state and an all-cylinder run where all the four cylinders run normally. Especially when the cooling water temperature is not higher than a threshold value To (60° C.), the all-cylinder run is executed unconditionally or, when the cooling water temperature is not higher than the threshold value, the cut-off-cylinder run is not executed; that is, this threshold value To is a condition for change over between the cut-off-cylinder run and the all-cylinder run. The EGR controller controls the EGR actions that NOx in the exhaust gas is reduced by decrease in the combustion temperatures at the cylinder cut-off engine through recalculation of the exhaust gas to the induction side, and the EGR actions are controlled to different EGR rates as conditioned in regard to the engine running states, whether the cut-off-cylinder run or the all-cylinder run.

In general, if compared with a case of the cut-off-cylinder run at the same cooling water temperatures, when the all-cylinder run is executed at low temperature range where the cooling water temperature is lower than the threshold value To, such as 40° C., increase in the pumping loss and decrease in the charging efficiency cause decrease in the combustion temperatures to result in decrease in the NOx generation during the run but increase in the fuel adhesion on the combustion chamber, and thus the cylinder cut-off engine tends to generate unburnt gas. Moreover, since the conventional EGR controller executes the EGR actions on the cylinder cut-off engine at the all-cylinder run even in such low temperature range as described above, the combustion temperature decreases the further and thus the above-described problem becomes more obvious.

Further, if the running state of the cylinder cut-off engine is changed over between the cut-off-cylinder run and the all-cylinder run, the engine combustion state and the exhaust gas are likely to be unstabilized. Since the above-described conventional EGR controller for cylinder cut-off engine only modifies the EGR rate at the same time as the running state changeover of the cylinder cut-off engine, unstableness of the combustion state at the above-described transition period increases. That is, in the state immediately after changeover from the all-cylinder run to the cut-off-cylinder run, since the combustion temperature increases with the enhanced filling efficiency at the cylinders that continue running, the w combustion state becomes temporarily unstable. The EGR actions, if executed for these cylinders in the unstable combustion state, will increase the unstableness of the combustion state. On the contrary, when the EGR actions are executed at the cylinder cut-off engine while the cut-off-cylinders are running, the combustion temperature has been decreased inside the running cylinders and, if the cut-off-cylinder run is changed over into the all-cylinder run in this state, the combustion state also becomes temporarily unstable since the combustion temperature decreases further along with decrease in the filling efficiency. If the EGR actions are executed in this unstable combustion state, the unstableness of the combustion state inside the cylinders will also be increased.

SUMMARY OF THE INVENTION

The present invention as a solution to the above-described problems is purposed to provide a cylinder-cut-off-engine EGR controller which can improve the fuel efficiency.

To solve the above object, according to the first aspect of the invention, there is provided an EGR controller 1 for a cylinder cut-off engine 3 which controls EGR actions wherein exhaust gas from the cylinder cut-off engine 3 which can change over a running condition between an all-cylinder run with all cylinders 3a running and a cut-off-cylinder run with some of cylinders 3a cut off is recirculated to an induction side via an EGR path (an EGR pipe 13), comprising: an open/close unit (for example, an EGR control valve 6 in the embodiment described below, likewise in this clause) for opening and closing the EGR path (the EGR pipe 13), a detecting unit (a water temperature sensor 5) for detecting an engine temperature (cooling water temperature TW) at the cylinder cut-off engine 3, a comparing unit (the ECU 2, Steps 3 and 4, and Steps 9 and 10 in FIG. 2) for comparing the engine temperature (cooling water temperature TW) detected by this detecting unit (a water temperature sensor 5) with a first predetermined temperature (upper limit value TWE1H) and a second predetermined temperature (lower limit value TWE1L) that is lower than this first predetermined temperature (upper limit value TWE1H), a determining unit (the ECU 2, Step 2 in FIG. 2) for determining the running states of the cylinder cut-off engine, whether at the all-cylinder run or the cut-off-cylinder run, and a control unit (the ECU 2) for control of the EGR actions so as to be executed (Steps 6 through 8) if the engine temperature (cooling water temperature TW) is higher (determined as "Yes" at Step 10 in FIG. 2) than the first predetermined temperature (upper limit value TWE1H) while at the all-cylinder run (determined as "No" at Step 2 in FIG. 2) or if the engine temperature (cooling water temperature TW) is higher (determined as "Yes" at Step 3 in FIG. 2) than the second predetermined temperature (lower limit value TWE1L) while at the cut-off-cylinder run (determined as "Yes" at Step 2 in FIG. 2) by driving the open/close unit (the EGRcontrol valve 6) so as to open or close, depending on a result of comparison by the comparing unit and on a result of determination by the determining unit.

With this EGR controller for cylinder cut-off engine, the EGR actions are executed when the engine temperature is higher than the first predetermined temperature while at the all-cylinder run or when the engine temperature is higher than the second predetermined temperature while at the cut-off-cylinder run. If the first predetermined temperature is set to a temperature equivalent to a threshold value, which is one of the changeover conditions, the cut-off-cylinder run is available with the present invention while the EGR actions are being executed at a low temperature range under the first predetermined temperature and over the second predetermined temperature, which is a lower temperature range where the all-cylinder run has been performed conventionally while the EGR actions are executed. Execution of the cut-off-cylinder run in the low temperature range where the all-cylinder run has been performed conventionally decreases pumping loss in the running cylinders and increases the charging efficiency. This increases combustion temperatures and decreases the amount of fuel adhesion on the combustion chamber walls, consequently improving the fuel efficiency and decreasing unburnt gas in the exhaust gas. Additionally, the NOx in the exhaust gas, which tends to increase with increase in the combustion temperature, can be restrained by executing the EGR actions in the same way as conventional. As described above, compatible achievement of both the unburnt gas reduction and the NOx control enables exhaust gas improvement. Thus, both the fuel efficiency and the exhaust gas can be improved. Moreover, the second predetermined temperature is set up to such a temperature as where, if the EGR actions are executed at temperatures lower than this during the cut-off-cylinder run, the combustion temperature becomes excessively low to the contrary of the description above to result with increase in the fuel adhesion to the combustion chamber walls and in the unburnt gas in the exhaust gas as well as degradation of the fuel efficiency.

Further, according to the second aspect of the invention, there is provided an EGR controller 1 for the cylinder cut-off engine 3, which controls EGR actions wherein exhaust gas from the cylinder cut-off engine 3 which can change over a running condition between an all-cylinder run where all cylinders are running and a cut-off-cylinder run with some of cylinders 3a cut off is recirculated to an induction side via an EGR path (an EGR pipe 13), comprising: an open/close unit (for example, an EGR control valve 6 in the embodiment described below) for opening and closing the EGR path (the EGR pipe 13), a determining unit (an ECU 2, Steps 1 through 5, and Steps 9 and 10) for determining whether conditions for execution of the EGR actions are fulfilled or not, and a control unit (the ECU 2) for control of changeover between execution and stop of the EGR actions (Steps 6 through 9, and Steps 12 and 13) by driving the open/close unit (the EGR control valve 6) so as to open or close, as conditioned in regard to results of this determining unit, in such manner that, at the time of changeover of the running states, changeover timings of the EGR actions (time t5 and time t6) will not coincide with changeover timings of the running states (time t4 and time t7).

The EGR controller for cylinder cut-off engine changes over between the execution and stop of the EGR actions by driving the open/close unit so as to open and close as conditioned in regard to results as determined by the determining unit and, if the running state of the cylinder cut-off engine changes over between the all-cylinder run and the cut-off-cylinder run, the changeover timing of the EGR actions will not coincide with the changeover timing of the running states. Therefore, the running state changeover and the EGR action changeover will not occur at the same time and thus the EGR action changeover can be executed at any time when the running state of the cylinder cut-off engine or the combustion state is stable. Accordingly, different from the conventional one, the EGR actions can be executed without increasing the unstableness of the combustion state immediately after the running state changeover and thus the more stable combustion state can be ensured. The exhaust gas amount recirculated by the EGR action is increased and thus, the fuel efficiency is improved.

As for the above, it is favorable that the control unit (the ECU 2) executes the EGR actions at such a timing as after completion of changeover of the running states (time t5) if to be changed over so as to execute the EGR actions (Steps 6 through 8) in a case wherein the. running state of the cylinder cut-off engine is changed over from the all-cylinder run to the cut-off-cylinder run (a state shown in FIG. 3, wherein determined as "Yes" at Steps 1 through 3 and 5 but determined as "No" at Step 4) and that the control unit stops the EGR actions at such a timing as before changeover of the running states (time t6) if to be changed over so as to stop the EGR actions (Steps 12 and 13) in a case wherein the running state is changed over from the cut-off-cylinder run to the all-cylinder run (a state shown in FIG. 4 wherein determined as "Yes" at Steps 1 and 9 but determined as "No" at Steps 2 and 10).

Since this EGR controller for cylinder cut-off engine executes the EGR actions at the timing after completion of the running state changeover from the all-cylinder run to the cut-off-cylinder run, if the timing for execution of the EGR actions is set up appropriately, in a way different from the conventional one, the EGR actions can be disabled at the time of unstable combustion state and executed after stabilization. Therefore, the more stable combustion state can be ensured at the time of changeover from the all-cylinder run to the cut-off-cylinder run. In the same way, since the EGR actions are stopped at a timing before the running state changes over from the cut-off-cylinder run to the all-cylinder run, if the timing for stop of the EGR actions is set up appropriately, the changeover to the all-cylinder run can be executed at the time of combustion state stabilization after stop of the EGR actions. Therefore, the more stable combustion state can be ensured at the time of changeover from the all-cylinder run to the cut-off-cylinder run. Thus, at the time of changeover from the cut-off-cylinder run to the all-cylinder run, the more stable combustion state can be ensured.

DETAILED DESCRIPTION OF THE PREFERRED EMBODIMENTS

Figure 1:
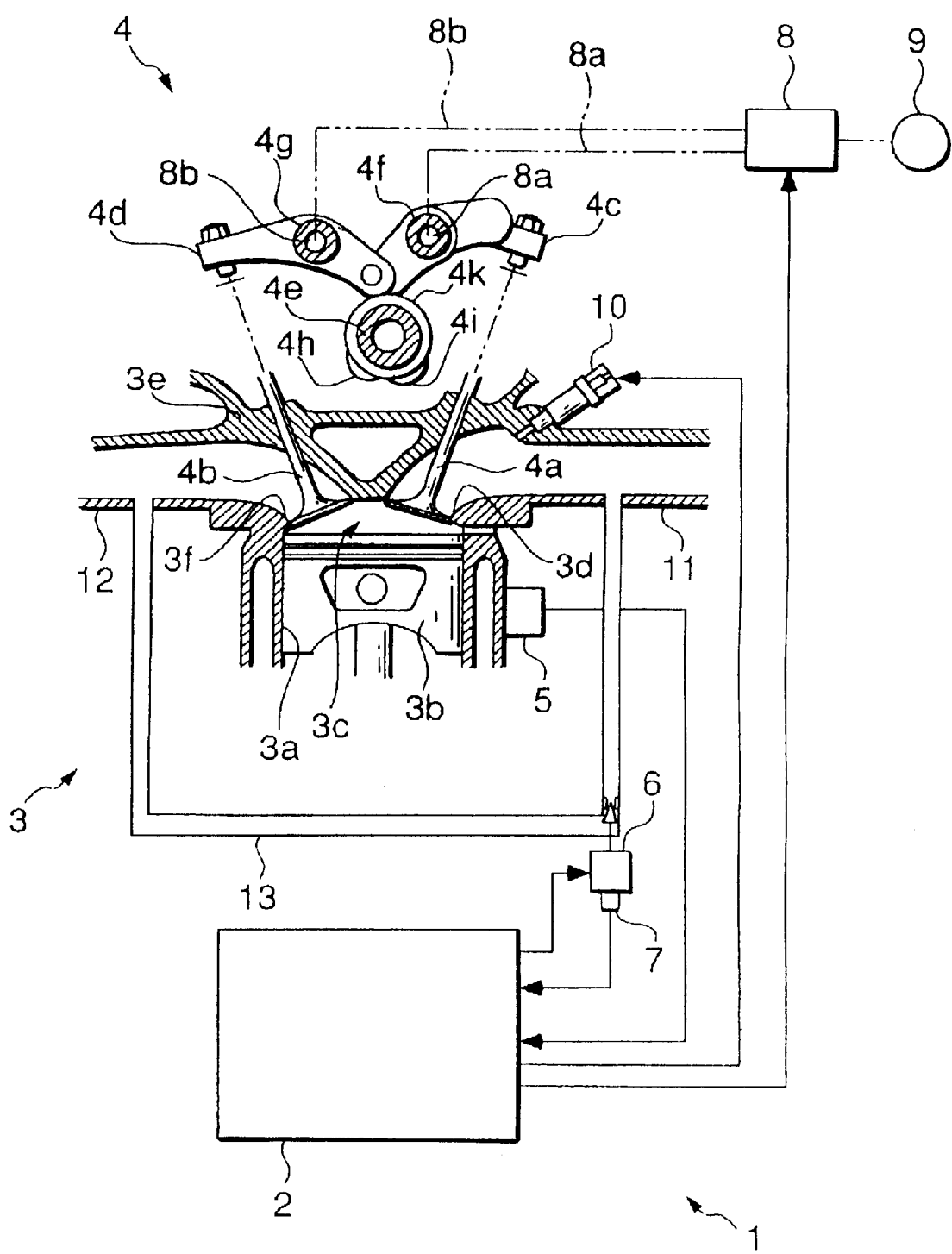
FIG. 1 is a drawing that shows a structural outline of a cylinder-cut-off-engine EGR controller and a cylinder cut-off engine according to an embodiment of the present invention.

With references to the drawings, a cylinder-cut-off-engine EGR controller as an embodiment of the present invention is described now. FIG. 1 shows a structural outline of a cylinder cut-off(suspending) engine (hereinafter referred to as "engine") and an EGR controller thereof. As shown in the figure, the EGR controller 1 comprises an ECU (comparing unit, determining unit and control unit) 2, and an EGR control valve (open/close unit) 6, oil hydraulic control mechanism 8 and such are connected to the ECU 2 which receives detection signals from a water temperature sensor (detecting unit) 5 for detection of cooling water temperature (engine temperature) TW of the engine 3, a lift sensor 7 for detection of the valve lift amount of the EGR control valve 6 and so forth. As described below, the ECU 2 controls the EGR actions by driving to open or close the EGR control valve 6 in response to the input signals and changes over the running state of the engine 3 between the all-cylinder run and the cut-off-cylinder run by driving the oil hydraulic mechanism 8 as conditioned in regard to predetermined running parameters described below.

The engine is a V-type six-cylinder SOHC engine, which runs with changeover between the all-cylinder run whereat all of the six cylinders run normally and the cut-off-cylinder run whereat fuel supply to three cylinders on the right bank of the six cylinders is cut off to maintain these three cylinders together with both the induction and exhaust valves 4a and 4b in a state of cut-off, as conditioned in regard to the predetermined running parameters (such as throttle opening extent, engine revolving speed, driving speed, cooling water temperature TW, acceleration and deceleration states, and number of gears).

FIG. 1 shows sectional structure of a significant part of the right bank of the engine 3, which is described below. As shown in the figure, each cylinder 3a of the engine 3 comprises a piston 3b and a valve driving mechanism 4, and each valve driving mechanism comprises two induction valves 4a and two exhaust valves 4b (the figure shows only one for each), induction and exhaust rocker arms 4c and 4d for driving the induction valves 4a and exhaust valves 4b respectively, a cam shaft 4e for driving the rocker arms 4c and 4d, a cam shaft for driving the rocker arms 4c and 4d, and so forth.

Each of the induction valves 4a is attached to a cylinder head 3e so as to open and close the inlet port 3d of a combustion chamber 3c of the engine 3 and disposed so as to move freely between a valve closing position (a position shown in FIG. 1) whereat the inlet port 3d is shut off and a valve opening position (a position not shown in the figure) whereat the inlet port 3d is opened by protruding inside the combustion chamber 3c. The induction valve 4a comprises a coil spring that is not shown in the figure, and is normally applied with a force toward the valve closing position side. In the same way as the induction valves 4a, each of the exhaust valves 4b is attached to the cylinder head 3e so as to open and close the outlet port 3f of the combustion chamber 3c and disposed so as to move freely between a valve closing position (a position shown in FIG. 1) whereat the outlet port 3f is shut off and a valve opening position (a position not shown in the figure) whereat the outlet port 3f is opened by protruding inside the combustion chamber 3c. The exhaust valve 4b also comprises a coil spring that is not shown in the figure, and is normally applied with a force toward the valve closing position side.

The induction and exhaust rocker arms 4c and 4d are attached to induction and exhaust rocker arm shafts 4f and 4g respectively so as to revolve freely, and the induction and exhaust rocker arm shafts 4f and 4g which extend in the direction of depth in FIG. 1 are securely fixed by a holder not shown in the figure. The outer end parts of the induction and exhaust rocker arms 4c and 4d contact with upper end parts of the induction and exhaust valves 4a and 4b respectively, and rollers that are not shown in the figure are attached to internal end parts of the induction and exhaust rocker arms 4c and 4d respectively. Induction and exhaust coupling rocker arms that are not shown in the figure are normally coupled to the induction and exhaust rocker arms 4c and 4d respectively, and rollers that are not shown in the figure are attached to end parts on cam shaft 4e sides of the induction and exhaust coupling rocker arms so as to rotate freely.

The cam shaft 4e comprises induction and exhaust driving cams 4h and 4i with cam surfaces and of predetermined sectional shapes and cut-off cams 4k (only one is shown in the figure) of true circular section. The the induction and exhaust coupling rocker arm rollers are normally in contact with cam surfaces of the induction and exhaust driving cams 4h and 4I respectively, which surfaces the cam shafts 4e roll over while being guided by the cam surfaces when the cam shaft 4e rotates. This rolling movement makes the induction and exhaust coupling rocker arms revolve around the induction and exhaust rocker arm shafts 4f and 4g respectively and, along with this, the induction and exhaust rocker arms 4c and 4d revolve around the induction and exhaust rocker arm shafts 4f and 4g respectively. These revolving movements drive the induction and exhaust valves 4a and 4b to open and close respectively against the applied forces of the the coil springs.

Induction and exhaust oil paths 8a and 8b are formed inside the induction and exhaust rocker arm shafts 4f and 4g respectively, and upstream-side ends of the induction and exhaust oil paths 8a and 8b are connected to the the oil hydraulic control mechanism 8. A valve driving mechanism 4 comprises an induction valve suspension mechanism which is incorporated into the induction rocker arm 4c and the induction coupling rocker arm and which is not shown in the figure and an exhaust valve suspension mechanism which is incorporated into the exhaust rocker arm 4d and the exhaust coupling rocker arm and which is not shown in the figure, and downstream-side ends of the induction and exhaust oil paths 8a and 8b are connected to these induction and exhaust valve suspension mechanisms.

The oil hydraulic control mechanism 8 is a combination of a solenoid valve and an oil hydraulic assist pump, both of which are connected to the ECU 2, and the oil hydraulic mechanism 8 is normally applied with low oil hydraulic pressure from an oil hydraulic pressure source 9. The oil hydraulic assist pump is started up with a signal from the ECU 2, and this increases the oil hydraulic pressure from a low oil hydraulic pressure to a high oil hydraulic pressure. The solenoid valve acts so as to apply the low oil hydraulic pressure to the induction and exhaust valve suspension mechanisms via the induction and exhaust oil paths 8a and 8b at the time of no excitation and acts so as to apply the high oil hydraulic pressure from the oil hydraulic assist pump to the induction and exhaust valve suspension mechanisms selectively when excited with a signal from the ECU 2. In this way, the oil hydraulic control mechanism 8 controls the oil hydraulic pressure for the induction and exhaust valve suspension mechanisms normally to be a low oil hydraulic pressure but, when driven by the ECU 2, at a high oil hydraulic pressure.

When the high oil hydraulic pressure is applied from the oil hydraulic pressure control mechanism 8, the induction and exhaust valve suspension mechanisms uncouple the induction and exhaust rocker arms 4c and 4d from the induction and exhaust coupling rocker arms. At the time of uncoupling from the induction and exhaust coupling rocker arms, the above-described rollers of the induction and exhaust rocker arms 4c and 4d are made so as to be guided along the cum surfaces of the the cut-off cams 4k of the cam shafts 4e and, in this case, the induction and exhaust rocker arms 4c and 4d are held in the state shown in FIG. 1 with the forces applied by the coil springs of the induction and exhaust valves 4a and 4b without revolving around the induction and exhaust rocker arm shafts 4f and 4g respectively since the cut-off cams 4k have true circle sections. Thus, the induction and exhaust valves 4a and 4b go into the cut-off state.

Figure 3:
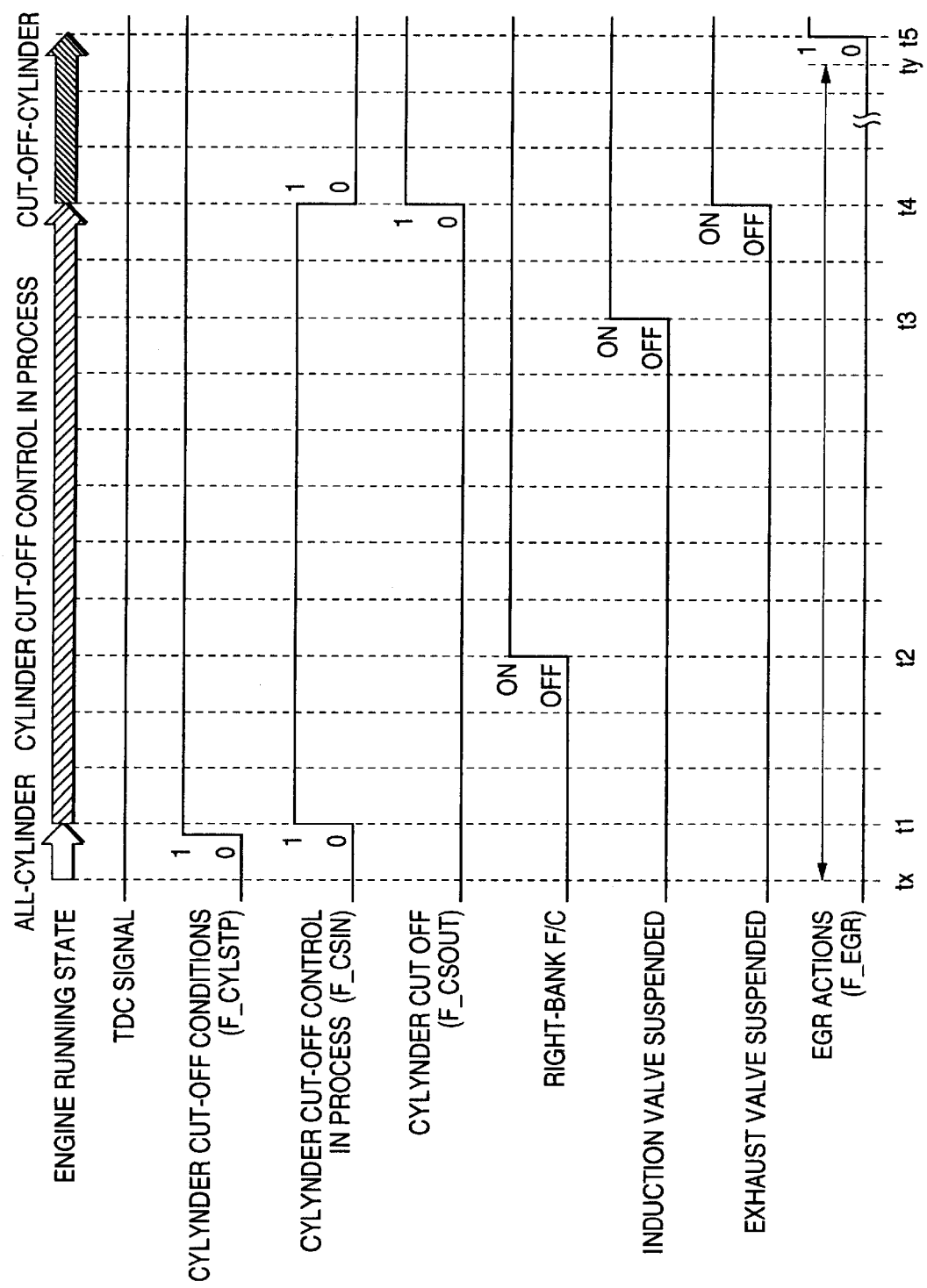
FIG. 3 is a time chart for changeover of the cylinder cut-off engine from the all-cylinder run to the cut-off-cylinder run so as to execute the EGR actions.
Figure 4:
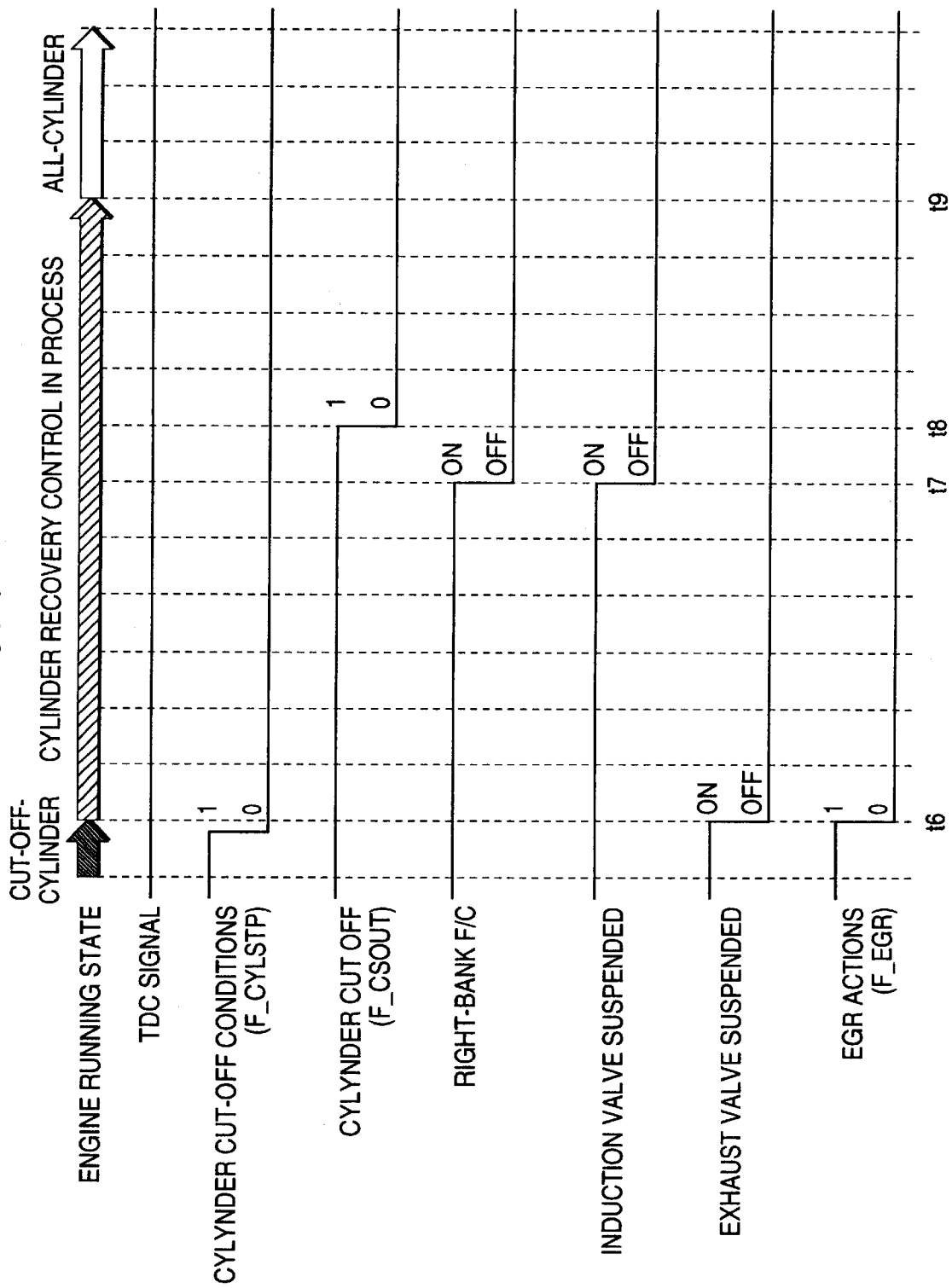
FIG. 4 is a time chart for changeover of the cylinder cut-off engine from the cut-off-cylinder run to the all-cylinder run so as to stop the EGR actions.

On the contrary, when the low oil hydraulic pressure is applied to the the induction and exhaust valve suspension mechanisms respectively by suspending the drive of the oil hydraulic control mechanism 8 by the ECU 2, the induction and exhaust valve suspension mechanisms couple the induction and exhaust rocker arms 4c and 4d with the induction and exhaust coupling rocker arms. This returns the induction and exhaust valves to the action-enable state. As described above, the induction and exhaust valves 4a and 4b can be changed over between the stop and action-enable states through driving and stopping of the oil hydraulic control mechanism 8 by the ECU 2 at such timings as shown in FIGS. 3 and 4 described below.

The right bank of the engine 3 has the above-described structure and the left bank has exactly the same structure as the right bank except that the induction and exhaust valve suspension mechanisms for the induction and exhaust valves 4a and 4b and the induction and exhaust oil paths 8a and 8b are not provided.

Fuel injection valves 10 are attached to the engine 3 so as to face the inlet ports 3d respectively, and the fuel injection and the ECU 2 controls the duration and timing of the fuel injection by the fuel injection valves 10. As described later, the fuel injection valves on the right bank are suspended to execute a fuel cut (hereinafter described as "F/C") control where the fuel supply to the right bank is cut off. The the water temperature sensor 5 which consists of thermistors and so forth is attached to the engine 3, and the water temperature sensor 5 detects the engine water temperature TW at the engine 3 and sends the detection signal to the ECU 2.

The engine 3 comprises the EGR pipe (EGR path) 13 for connecting an induction pipe 11 and an exhaust pipe 12. The EGR pipe 13 is purposed for execution of the EGR actions wherein the exhaust from the engine 3 is recirculated to the induction side for reduction of the NOx in the exhaust gas through decrease in the combustion temperature inside the the combustion chamber 3c, and one end thereof is connected to the induction pipe 11 at a downstream side of a throttle valve that is not shown in the figure while the other end thereof is connected to the exhaust pipe 12 at an upstream side of a three-dimensional catalyst that is not shown in thew figure.

The the EGR control valve 6 is attached to the EGR pipe 13. The EGR control valve 6 is a linear solenoid valve wherein the valve lift amount thereof varies as conditioned in regard to later-described drive signals from the ECU 2, and thus opening and closing the EGR pipe 13. The the valve lift sensor 7 is attached to the EGR control valve 6, and the ECU 2 controls the amount of the recirculated exhaust gas amount on the induction side, or the EGR rate, through detection of an actual valve lift amount of the EGR control valve 6 with the detection signals from the valve left sensor 7 and feedback-control of the valve lift amount of the EGR control valve 6 as conditioned in regard to the detected value.

On the other hand, the engine 3 comprises a crank angle sensor (not shown in the figure) which outputs a TDC signal that is a pulse signal to the ECU 2 along with revolutions of a crank shaft that is not shown in the figure. The TDC signal is a signal which indicates that a piston 3b is at an upper dead point where to start the induction stroke in each cylinder 3a, and an output of six pulses occurs at every two revolutions of the crank shaft. The TDC signal is utilized as a trigger signal for execution of later-described control processing of the EGR actions by the ECU 2.

The ECU 2 is composed of a microcomputer which comprises a CPU, RAM, ROM, input-output interface, and so forth (none of these shown in the figure). The detection signals from the the water temperature sensor 5, lift sensor 7 and crank angle sensor are input to the microcomputer after A/D conversion and form correction. In response to the inputs, the microcomputer outputs drive signals to the oil hydraulic control mechanism 8 and EGR control valve 6 via the output interface, based on the control programs, tables maps and so forth which are stored in the ROM (none of these shown in the figure). The ECU executes the EGR actions as conditioned by them and also executes the changeover control between the all-cylinder run and the cut-off-cylinder run of the engine 3 as described later.

Figure 2:
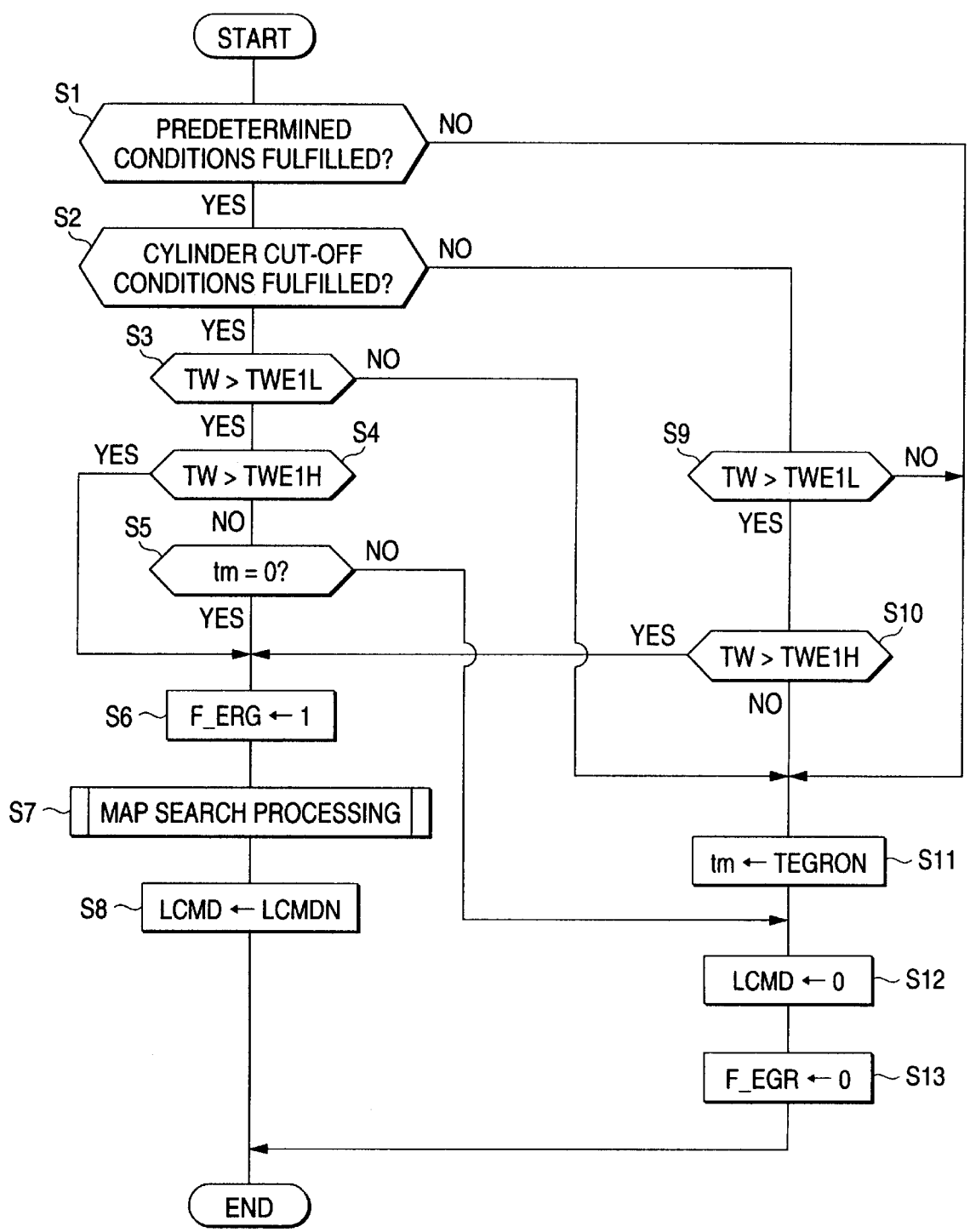
FIG. 2 is a flowchart that shows control processing of the EGR action of the EGR controller.

The control processing of the EGR actions that the ECU 2 executes is now described with references to the flowchart in FIG. 2. This processing is executed synchronously on every TDC signal input to the ECU 2.

In this processing, first at Step 1 (abbreviated as S1 in FIG. 2 and in the same way as for the following), whether predetermined conditions for execution of the EGR actions are fulfilled or not is determined. The predetermined conditions include, for example, that the feedback control of the air fuel ratio is being executed, that the fuel-cut run is not being executed, that the throttle valve is not fully opened, and so forth.

If the answer at Step 1 is "Yes", that is, if the predetermined conditions for execution of the EGR actions are fulfilled, whether the conditions for cylinder cut-off are fulfilled or not is determined at Step 2. Determination of the conditions for cylinder cut-off is executed as conditioned in regard to the cylinder cut-off flag F_CYLSTP. The cylinder cut-off flag F_CYLSTP is set up as conditioned in regard to predetermined run parameters in a cylinder cut-off determination processing program that is not shown in the figure, which is set to "1" when the cylinder cut-off conditions are fulfilled and reset to "0" when the cylinder cut-off conditions are not fulfilled. In this case, those which are utilized for the predetermined run parameters include the throttle opening extent, engine revolving speed, vehicle speed, engine water temperature TW, acceleration and deceleration states, and step number of gears. In a case wherein the cylinder cut-off flag F_CYLSTP changes over between "1" and "0", a changeover control is executed between the all-cylinder run and the cut-off-cylinder run of the engine 3 as in the time charts shown in FIGS. 3 and 4.

If the answer at Step 2 is "Yes", thus, if a cylinder cut-off flag F_CYLSTP is set to "1" at the cut-off-cylinder run, whether the cooling water temperature TW is higher than the lower limit value TWE1L as the second predetermined temperature (TW>TWE1L) or not is determined at Step 3. The lower limit value TWE1L is set up as a threshold value where the compatible achievement of both unburnt gas reduction and NOx control in the exhaust air and also the achievement of improvement in the fuel efficiency are possible without any excessive decrease in the combustion temperatures in the running cylinders 3a, if the EGR actions are executed at the cut-off-cylinder run at cooling water temperatures TW higher than this. Specifically, the set up value is 25° C., for example.

If the answer at Step 3 is "Yes", or if the cooling water temperature TW is higher than the lower limit value TWE1L, whether the cooling water temperature TW is higher than the upper limit value TWE1H as the first predetermined temperature (TW>TWE1H) or not is determined at Step 4. The upper limit value TWE1H is set up as a threshold value where the compatible achievement of both unburnt gas reduction and NOx control in the exhaust air and also the favorable running performance are available without any excessive decrease in the combustion temperatures in the running cylinders 3a, if the EGR actions are executed not only at the cut-off-cylinder run but also at all-cylinder run. Specifically, the set up value is 50° C., for example.

If the answer at Step 4 is "Yes", that is, if the cooling water temperature TW is higher than the upper limit value TWE1H, being determined as a state wherein the above-described combustion state is available if the EGR actions are executed, the EGR flag F_EGR is set to "1" at Step 6. The EGR flag F_EGR is a flag to indicate the execution or stop (no execution) of the EGR actions and the value "1" indicates the EGR actions being executed while the value "0" indicates stop (no execution) of the EGR actions.

Next, the valve lift amount LCMD calculation routine is executed at Step 7. At this calculation routine, the calculated valve lift amount LCMDN is obtained by searching a map to indicate relationship between the predetermined run parameter (for example, engine revolving speed and negative pressure inside the induction pipe) and the valve lift amount LCMD of the EGR control valve 6. Then, at Step 8, the calculated valve lift amount LCMDN is set for the valve lift amount LCMD to end the processing. The valve lift amount LCMD which has been set up in this way is now output to the EGR control valve 6 as a drive signal. As described above, the EGR actions are executed at Steps 6 through 8.

If the answer at Step 1 is "No", thus, if the predetermined conditions for execution of the EGR actions are not fulfilled, a down-count-type timer tm is set to a predetermined value TEGRON (for example, 200 to 500 msec) and started at Step 11. As described later, the timer tm is for setting up the EGR action execution timing and the EGR actions are executed as conditioned in regard to endings of the timer tm. Next, the valve lift value LCMD of the EGR control valve 6 is set to "0" and the EGR flag F_EGR is reset to "0" to end this processing (Steps 12 and 13). In this case, resetting of the valve lift value LCMD to "0" means closing of the EGR control valve 6, that is, closing of the EGR pipe 13 to stop the EGR actions. As described above, the EGR action is stopped at Steps 12 and 13.

If the answer at Step 2 is "No", that is, if the cylinder cut-off conditions are not fulfilled, whether the engine water temperature TW is higher than the lower limit value TWE1L or not is determined at Step 9, in the same way as at Step 7. If the engine water temperature TW is not higher than the lower limit value TWE1L, Steps 11 through 13 are executed in the same way as above. And, if higher, whether the engine water temperature TW is higher than the upper limit value TWE1H or not is determined at Step 10 in the same way as at Step 4. If the engine water temperature TW is higher than the upper limit value TWE1H, Steps 6 through 8 are executed in the same way as above but, if not higher than the upper limit value TWE1H, Steps 11 through 13 are executed.

If the answer at Step 4 is "No", that is, if the engine water temperature TW is at TWE1L<TW≦TWE1H, whether a timer tm has ended (tm=0) or not is determined at Step 5. If the answer is "Yes", that is, if the timer tm has ended, the combustion state is stabilized by elapse of time after transition of the running state of the engine 3 from the all-cylinder run to the cut-off-cylinder run. And thus, since the above-described effect can be expected from execution of the EGR actions, steps 6 through 8 are executed. But, if the timer tm has not ended, the EGR actions are stopped by execution of steps 12 and 13. As described above, ECU 2 controls the execution and stop of the EGR actions.

As expounded above, at the all-cylinder run, the present embodiment of the cylinder-cut-off-engine EGR controller 1 executes the EGR actions when the cooling water temperature TW is higher than the upper limit value TWE1H (TW>TWE1H). And, as described above, the upper limit value TWE1H is set up to such an appropriate threshold value as the combustion temperatures will not decrease excessively when the EGR actions are executed. On the other hand, at the cut-off-cylinder run, the EGR actions are executed when the cooling water temperature TW is higher than the lower limit value TWE1L and not higher than the upper limit values TWE1H (TWE1L<TW≦TWE1H) and also when higher than the upper limit value TWE1H. The lower limit value TWE1L is also set up to such an appropriate threshold value as the combustion temperatures will not decrease excessively when the EGR actions are executed at the cut-off-cylinder run. In this way, since the EGR controller of this embodiment executes the EGR actions at the cut-off-cylinder run in the low temperature range (TWE1L<TW≦TWE1H) where the conventional EGR controller has executed the EGR actions at the all-cylinder run, if compared with the conventional one, the combustion temperatures can be increased through reduction of the pumping loss in the running cylinders 3a. This can improve the fuel efficiency and reduce the unburnt gas in the exhaust gas through the reduction in the fuel adhesion amount on the combustion chamber walls 3c. Additionally, since the NOx in the exhaust gas which tends to increase with increase in the combustion temperature can be restrained by execution of the EGR actions in the same way as the conventional one, compatible achievement of both the unburnt gas reduction and the NOx control enables exhaust gas improvement. Thus, both the fuel efficiency and the exhaust gas can be improved.

Although the above-described mode of embodiment utilizes the cooling water temperature TW as the engine temperature, the embodiment is not limited to this but available with any other element which reflects the engine combustion temperatures, such as the cylinder-internal pressure. Additionally, the first and second predetermined temperatures TWE1H and TWE1L are set up to 50° C. and 25° C. respectively in the above described mode of embodiment, the first and second predetermined temperatures TWE1H and TWE1L are not limited to these but possible to be set up appropriately to such temperatures as where the fuel efficiency and the exhaust gas can be improved, as conditioned in regard to the engine types.

Moreover, although the lower limit value TWE1L is fixed (for example, 25° C.) in the above-described mode of embodiment, the embodiment is not limited to this but available with provision of an atomization state detecting unit for detecting of fuel atomization state, where the lower limit value TWE1L may be modified to or corrected with a lower value if the atomization state detected by the atomization detecting unit is equivalent to a favorable atomization state. This enables further improvement of the fuel efficiency. In this case, the atomization state detecting unit can be anything that can detect fuel temperatures, fuel types (inclination to atomization), a swirl state and an air assist state inside the combustion chamber, and so forth.

Next, the relationship between concrete action timings at the running state changeover and timings at the EGR action changeover is now described with references to the time charts in FIGS. 3 and 4 in the case wherein the engine water temperature TW is at TWE1L<TW≦TWE1H with fulfillment of the predetermined conditions at Step 1 as shown in FIG. 2. In both figures, the horizontal axes indicate time while the dotted lines that intersect the horizontal axes in the figures indicate the TDC signal input timings.

To start with, FIG. 3 shows a case of changeover to the execution of the EGR actions when the running state is changed over from the all-cylinder run to the cut-off-cylinder run. As shown in the figure, if the cylinder cut-off flag F_CYLSTP is set to "1" on fulfillment of the cylinder cut-off conditions during the all-cylinder run, a flag F_CSIN that indicates that the cylinder cut-off control is active is set to "1" at a TDC signal input timing (time t1) immediately after this. In this case, since the engine water temperature TW is at TWE1L<TW≦TWE1H, the timer tm has already started at a TDC signal input timing (time tx) before the flag F_CYLSTP is set to "1", as shown at Step 2, and Steps 9 through 11 in FIG. 2 described above, At a third TDC signal input timing (time t2) after the above-described flag F_CSIN is set to "1", F/C at the cylinders 3a on the right bank of the engine 3 is executed (OFF→ON). Next, cut-off of the induction valves 4a is executed at a sixth TDC signal input timing (time t3) from the F/C execution timing (time t2) and cut-off of the exhaust valves 4b is executed at the eighth TDC signal input timing (time t4). The suspension of the induction valves 4a is executed before the suspension of the exhaust valves 4b to ensure discharge of the combustion gas; otherwise, if the exhaust valves 4b are suspended simultaneously with the induction valves 4a, or if the exhaust valves 4b are suspended before the induction valves 4a, the combustion gas will remain inside of the cylinders 3a. As described above, the suspension of the induction valves 4a and the exhaust valves 4b is executed by driving the oil hydraulic assist pump and solenoid valve of the oil hydraulic control mechanism 8 and applying the high oil hydraulic pressure to the induction valve suspension mechanism and the exhaust valve suspension mechanism respectively at the above-described timings (times t3 and t4).

Simultaneously on the execution of the suspension of the exhaust valves 4b, the above-described flag F_CSIN is reset to "0" while a flag F_CSOUT that indicate that cylinders are cut off is set to "1". This ends the cylinder cut-off control, and the all-cylinder run is fully changed over to the cut-off-cylinder run. After this, the EGR flag F_EGR is set to "1" and the EGR actions are executed at the TDC signal input timing (time t5) immediately after the end time ty of the timer tm. That is, with drive of the EGR control valve 6 for the valve lift amount LCMD which has been set up at Step 8 in FIG. 2, the exhaust gas is recirculated to the induction side via the EGR pipe 13. The predetermined value TEGRON for the timer tm is set so as to end at a point of time when the combustion state in the cylinders on the left bank is stabilized during the engine 3 is at the cut-off-cylinder run, and thus the EGR actions are executed at a timing (time t5) after stabilization of the combustion state in the cylinders on the left bank.

As described above, if execution of the EGR actions is to be selected when the running state of the engine 3 is changed over from the all-cylinder run to the cut-off-cylinder run, the EGR actions are executed at the timing (time t5) which is postponed behind the changeover timing (time t4) from the all-cylinder run to the cut-off-cylinder run. The interval between time t4 and time t5 is decided by the predetermined value TEGRON which is set at the timer tm and since the predetermined value TEGRON is set so as to end at the point of time when the combustion state in the cylinders on the leftbank is stabilized, the EGR actions can be executed at the timing (time t5) when the combustion state is stabilized in the cylinders on the left bank after changeover to the cut-off-cylinder run. Therefore, being different from the conventional one, the EGR actions can be executed not at the time when the left-bank cylinders are in unstable combustion state but after the stabilization, and thus the more stable combustion state can be ensured at the time of changeover from the all-cylinder run to the cut-off-cylinder run.

FIG. 4 shows a case of changeover to the stop of the EGR actions when the running state is changed over from the cut-off-cylinder run to the all-cylinder run. As shown in the figure, if the flag F_CYLSTP is reset to "0" by failure in fulfillment of the cylinder cut-off conditions during the cut-off-cylinder run, the flag F_EGR is reset to "0" at the TDC signal input timing (time t6) immediately after this and the EGR actions are stopped. That is, the EGR control valve 6 is driven to shut off for the valve lift amount LCMD (LCMD=0) as set up at Step 12 in FIG. 2 and thus the EGR pipe 13 is shut off. At the same time as this, the suspension of the exhaust valves 4b is cancelled. That is, drive of the oil hydraulic assist pump and solenoid valve of the oil hydraulic control mechanism 8 is stopped and thus the low oil hydraulic pressure is applied to the exhaust valve suspension mechanism.

After this, the suspension of the induction valves 4a is cancelled at a sixth TDC signal input timing (time t7) and simultaneously the F/C at the right bank is stopped (ON→OFF). This starts combustion in the right bank cylinders 3a. Then, the flag F_CSOUT that indicate that cylinders are cut off is reset to "0" at the next TDC signal input timing (time t8) and the cylinder reset control ends at the fourth TDC signal input timing (time t9) from this.

As described above, if stop of the EGR actions is to be selected when the running state of the engine 3 is changed over from the cut-off-cylinder run to the all-cylinder run, the right-bank cylinders 3 can be changed over into the combustion state at the point of time of combustion stabilization in the left-bank cylinders after stop of the EGR actions since there exists an interval for six TDC signals between the EGR action stop timing (time t6) and the changeover timing (time t7) when the right-bank cylinders 3a are changed over into the combustion state. Therefore, the engine 3 can change over to the state of combustion with all cylinders with almost no influence from changeover of the EGR actions, the more stable combustion state can be ensured at the changeover from the cut-off-cylinder run to the all-cylinder run. {In this case, as shown in FIG. 4, the recovery timing for the all-cylinder run of the engine 3 is at time t9 while the combustion start timing for the cut off right-bank cylinders 3a is at time t7, and thus it is appropriate to compare the EGR action stop timing (time t6) with the right-bank combustion start timing (time t7) if the influence on the combustion state of left-bank cylinders from stop of the EGR actions is considered}

As expounded above, in the cylinder-cut-off-engine EGR controller 1 of this embodiment, the more stable combustion state can be ensured at the time of changeover of the running state of the engine 3, either when the EGR actions are executed on changeover from the all-cylinder run to the cut-off-cylinder run or when the EGR actions are stopped on changeover from the cut-off-cylinder run to the all-cylinder run.

Although the EGR action stop timing (time t6) and the exhaust valve 4b cut-off cancellation timing (time t6) are synchronous when the engine 3 changes over from the cut-off-cylinder run to the all-cylinder run in the above-described mode of embodiment, the embodiment is not limited to this but available in a timing with elapse of a predetermined interval after stop of the EGR actions, for example, after cancellation of the cut-off of the exhaust valve 4b a TDC signal input timing after some TDC signal inputs, the F/C control cancellation and the exhaust valve 4b cut-off cancellation may be executed at a TDC signal input timing after some other TDC signal inputs. This can realize a changeover of the engine 3 from the cut-off-cylinder run to the all-cylinder run when the combustion state of the engine 3 is stabilized further more.

Figure 5:
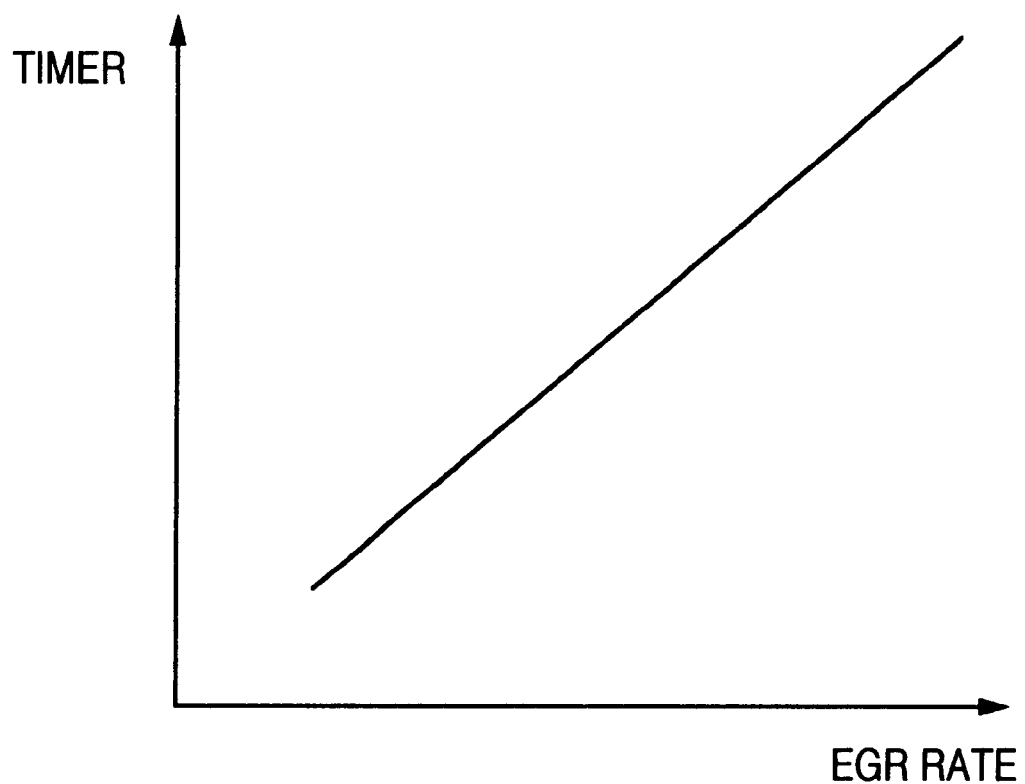
FIG. 5 is a table to show the relationship between the EGR rate and the timer.

As an alternative, in a case wherein the running state of the engine 3 is changed over between the cut-off-cylinder run and the all-cylinder run after the changeover of the EGR actions from the stop to the execution, the changeover timing may be controlled so as to be modified as conditioned in regard to the EGR rate then set up. To describe concretely, the timer value for deciding the running state changeover timing may be set up as conditioned in regard to the EGR rate with reference to a table which indicates the relationship between the EGR rate and the timer, as shown in FIG. 5. This enables postponing the running state changeover timing by setting the larger timer value for the larger EGR rate, the influence from the EGR action changeover on the combustion state at the engine 3 can be reduced further more and thus enables changeover of the engine 3 after stabilization of the combustion state.

Moreover, although the above-described mode of embodiment continued execution of the EGR actions irrelevant to the running state changeover of the engine 3 if the engine water temperature is at TWE1H<TW, the EGR actions may be executed at a postponed timing of this changeover timing by stopping the EGR actions during the running state changeover even in a case like this through execution of Steps 5 and 11 with utilization of such timer tm as described above enables.

As described above, the cylinder-cut-off-engine EGR controller in compliance with the present invention can improve the fuel efficiency and the exhaust gas through the appropriate execution of the EGR actions when the engine temperature are low.

Further, the cylinder-cut-off-engine EGR controller in compliance with the present invention can control the EGR actions so as to ensure the more stable combustion state when the running state is changed over between the all-cylinder run and the cut-off-cylinder run. Thus, the exhaust gas amount recirculated by the EGR is increased, and the fuel efficiency is improved.

While only certain embodiments of the invention have been specifically described herein, it will apparent that numerous modifications may be made thereto without departing from the spirit and scope of the invention.

The present disclosure relates to the subject matter contained in Japanese patent application Nos. Hei.10-343186 filed on Dec. 2, 1998 and Hei.10-343187 filed on Dec. 2, 1998 which are expressly incorporated herein by reference in its entirety.

What is claimed is:

1. An EGR controller for a cylinder cut-off engine, which controls an EGR action so that exhaust gas from said cylinder cut-off engine is recirculated to an induction side via an EGR path, said cylinder cut-off engine being changeable over a running state between an all-cylinder run where all cylinders are running and a cut-off-cylinder run where a part of the cylinders are cut off, said EGR controller comprising:

an open/close unit opening and closing said EGR path;

a detecting unit detecting an engine temperature at said cylinder cut-off engine;

a comparing unit comparing said engine temperature detected by said detecting unit with a first predetermined temperature and a second predetermined temperature that is lower than said first predetermined temperature;

a determining unit determining whether the running state of said cylinder cut-off engine is said all-cylinder run or said cut-off-cylinder run; and a control unit controlling said EGR action so as to be executed when said engine temperature is higher than said first predetermined temperature at said all-cylinder run, and when said engine temperature is higher than said second predetermined temperature at said cut-off-cylinder run, by driving said open/close unit so as to open or close in accordance with a result of comparison by said comparing unit and on a result of determination by said determining unit.

2. The EGR controller for the cylinder cut-off engine as claimed in claim 1, wherein said second value is modified in accordance with fuel atomization states.

3. The EGR controller for the cylinder cut-off engine as claimed in claim 2, wherein said second value is modified into a smaller value if the atomization state is in a favorable state.

4. The EGR controller for the cylinder cut-off engine as claimed in claim 2, further comprising an atomization detecting unit detecting said fuel atomization state, said unit being detectable with at least one of fuel temperatures, fuel types, swirl states inside combustion chambers, and air assist states.

5. The EGR controller for the cylinder cut-off engine as claimed in claim 1, further comprising:

another determining unit determining whether conditions for execution of said EGR actions are fulfilled or not; and said control unit further controlling the changeover between execution and stop of said EGR action by driving said open/close unit so as to open or close in accordance with results of said another determining unit, in such a manner that, at the time of changeover between said running states, a changeover timing of said EGR action shifts from a changeover timing of the running states.

6. The EGR controller for the cylinder cut-off engine as claimed in claim 5, wherein, in a case that said running state of said cylinder cut-off engine is changed over from said all-cylinder run to said cut-off-cylinder run, said control unit changes over so as to execute said EGR action at such a timing as after completion of the changeover of said running state.

7. The EGR controller for the cylinder-cut-off engine as claimed in claim 5, wherein, in a case that said running state is changed over from said cut-off-cylinder run to said all-cylinder run, said control unit changes over so as to stop said EGR action at such a timing as before the changeover of said running state.

8. The EGR controller for the cylinder-cut-off engine as claimed in claim 5, wherein, in a case wherein said running state of said cylinder cut-off engine is changed over from said all-cylinder run to said cut-off-cylinder run, said control unit changes over so as to execute said EGR action at such a timing as after completion of the changeover of said running states, and in a case wherein said running state is changed over from said cut-off-cylinder run to said all-cylinder run, said control unit changes over so as to stop said EGR action at such a timing as before the changeover of said running states.

9. The EGR controller for the cylinder-cut-off engine as claimed in claim 5, wherein, in a case that said engine running state is changed over between said cut-off-cylinder run and said all-cylinder run after said EGR action is changed over from the stop to the execution, a changeover timing of the running state is modified in accordance with an EGR rate then set up.

10. The EGR controller for the cylinder-cut-off engine as claimed in claim 9, wherein, if said EGR rate is the larger, said changeover timing is postponed the more.

11. An EGR controller for a cylinder cut-off engine, which controls an EGR action so that exhaust gas from said cylinder cut-off engine is recirculated to an induction side via an EGR path, said cylinder cut-off engine being changeable over a running state between an all-cylinder run where all cylinders are running and a cut-off-cylinder run where a part of the cylinders are cut off, said EGR controller comprising:

an open/close unit opening and closing said EGR path;

a determining unit determining whether conditions for execution of said EGR actions are fulfilled or not; and a control unit controlling the changeover between execution and stop of said EGR action by driving said open/close unit so as to open or close in accordance with results of said determining unit, in such a manner that, at the time of changeover of said running states, a changeover timing of said EGR action shifts from a changeover timing of the running states.

12. The EGR controller for the cylinder cut-off engine as claimed in claim 11, wherein, in a case that said running state of said cylinder cut-off engine is changed over from said all-cylinder run to said cut-off-cylinder run, said control unit changes over so as to execute said EGR action at such a timing as after completion of the changeover of said running state.

13. The EGR controller for the cylinder-cut-off engine as claimed in claim 11, wherein, in a case that said running state is changed over from said cut-off-cylinder run to said all-cylinder run, said control unit changes over so as to stop said EGR action at such a timing as before the changeover of said running state.

14. The EGR controller for the cylinder-cut-off engine as claimed in claim 11, wherein, in a case wherein said running state of said cylinder cut-off engine is changed over from said all-cylinder run to said cut-off-cylinder run, said control unit changes over so as to execute said EGR action at such a timing as after completion of the changeover of said running states, and in a case wherein said running state is changed over from said cut-off-cylinder run to said all-cylinder run, said control unit changes over so as to stop said EGR action at such a timing as before the changeover of said running states.

15. The EGR controller for the cylinder-cut-off engine as claimed in claim 11, wherein, in a case that said engine running state is changed over between said cut-off-cylinder run and said all-cylinder run after said EGR action is changed over from the stop to the execution, a changeover timing of the running state is modified in accordance with an EGR rate then set up.

16. The EGR controller for the cylinder-cut-off engine as claimed in claim 15, wherein, if said EGR rate is the larger, said changeover timing is postponed the more.

* * * * *